(12) United States Patent
Marappan

(10) Patent No.: US 7,724,881 B2
(45) Date of Patent: May 25, 2010

(54) COMMUNICATION DEVICE HAVING ADVANCED AND PLUGGABLE TELEPHONY FEATURES

(75) Inventor: Kumar Marappan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1402 days.

(21) Appl. No.: 11/032,335

(22) Filed: Jan. 10, 2005

(65) Prior Publication Data

US 2006/0153348 A1 Jul. 13, 2006

(51) Int. Cl.
*H04M 1/56* (2006.01)

(52) U.S. Cl. .............................. 379/88.19; 379/142.06

(58) Field of Classification Search .............. 379/88.12, 379/142.02–142.08, 88.19, 88.2, 88.21, 99.03, 379/118, 127, 127.01, 127.06, 207.15, 142.01, 379/210.02, 212.01, 215.01
See application file for complete search history.

(56) References Cited

U.S. PATENT DOCUMENTS

| | | | | |
|---|---|---|---|---|
| 5,724,408 | A | 3/1998 | Morganstein | 379/88 |
| 6,125,126 | A | 9/2000 | Hallenstål | 370/522 |
| 6,298,122 | B1 * | 10/2001 | Horne | 379/93.09 |
| 6,584,188 | B2 | 6/2003 | Kim | 379/211.02 |
| 6,631,188 | B1 | 10/2003 | Sands | 379/215.01 |
| 6,690,784 | B2 | 2/2004 | Renner et al. | 379/210.02 |
| 6,693,996 | B2 * | 2/2004 | Mansfield | 379/90.01 |
| 7,184,537 | B2 * | 2/2007 | McClure et al. | 379/215.01 |
| 7,184,573 | B2 * | 2/2007 | Malone et al. | 382/100 |
| 2002/0054674 | A1 * | 5/2002 | Chang et al. | 379/207.02 |
| 2002/0141558 | A1 | 10/2002 | Renner et al. | 379/210.02 |
| 2003/0053444 | A1 * | 3/2003 | Swartz | 370/352 |
| 2003/0138090 | A1 | 7/2003 | Hutchison, IV | 379/210.02 |
| 2003/0215070 | A1 * | 11/2003 | Akhteruzzaman et al. | 379/88.19 |
| 2004/0005043 | A1 | 1/2004 | Latter et al. | 379/142.01 |
| 2004/0096046 | A1 | 5/2004 | Lection et al. | 379/142.06 |
| 2004/0198361 | A1 * | 10/2004 | Amin | 455/445 |
| 2005/0129206 | A1 * | 6/2005 | Martin | 379/211.01 |
| 2005/0185784 | A1 * | 8/2005 | Chiu et al. | 379/210.02 |

FOREIGN PATENT DOCUMENTS

KR 2004037452 A * 5/2004

* cited by examiner

*Primary Examiner*—Fan Tsang
*Assistant Examiner*—Akelaw A Teshale
(74) *Attorney, Agent, or Firm*—Suiter Swantz pc llo

(57) ABSTRACT

A communication device includes one or more programmable modules for receiving and selectively handling a telephone call including pre-specified caller identification information. The programmable module includes a registry of caller identification information and instructions on how to handle a particular telephone call when the telephone call includes caller identification information specified in the registry. The communication device includes several programmable modules, each configured to provide different functionality for selectively handling a telephone call. The programmable modules are inserted and removed from ports included with the communication device for providing functionality as needed. The communication device includes a web engine for configuring the programmable modules utilizing a web browser. The communication device includes functionality for announcing caller identification information to a user upon receipt of a telephone call.

1 Claim, 6 Drawing Sheets

US 7,724,881 B2

COMMUNICATION DEVICE HAVING ADVANCED AND PLUGGABLE TELEPHONY FEATURES

FIELD OF THE INVENTION

The present invention generally relates to the field of telephone based communication devices, and more particularly to a communication device including one or more programmable modules for selectively handling telephone calls, wherein the programmable modules are configurable via a web based interface.

BACKGROUND OF THE INVENTION

Many telephone based communication devices are capable of receiving caller identification information included with a telephone call, such as digital caller identifying information transmitted between the first and second rings of the telephone. Typically, in order to utilize the caller identification information for handling certain telephone calls differently, e.g. for blocking or forwarding calls, a user must contact the provider of the telephone service, such as a telephone company, and request that certain calls be forwarded, blocked, or handled differently than normal. However, this may be a lengthy and time consuming process. Thus, there exists a need for a communication device capable of receiving a telephone call including caller identification information and selectively handling the telephone call based on caller identification information included with the telephone call, wherein a user of the communication device has the ability to configure the functionality for selectively handling the telephone call.

SUMMARY OF THE INVENTION

Accordingly, the present invention is directed to a communication device including one or more programmable modules for receiving and selectively handling a telephone call including pre-specified caller identification information. In one specific embodiment, the programmable module comprises Electrically Erasable Programmable Read Only Memory (EEPROM), including a registry of caller identification information and instructions on how to handle a particular telephone call when the telephone call includes caller identification information specified in the registry. The communication device may include several EEPROM chips, each configured to provide different functionality for selectively handling a telephone call. The EEPROM chips may be inserted and removed from ports included with the communication device for providing functionality as needed. The communication device also includes a web engine for providing the ability to configure the programmable modules. For instance, the web engine may provide a web browser with a Hypertext Markup Language (HTML) web page for configuring the programmable module. The communication device also includes functionality for announcing caller identification information to a user of the communication device.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
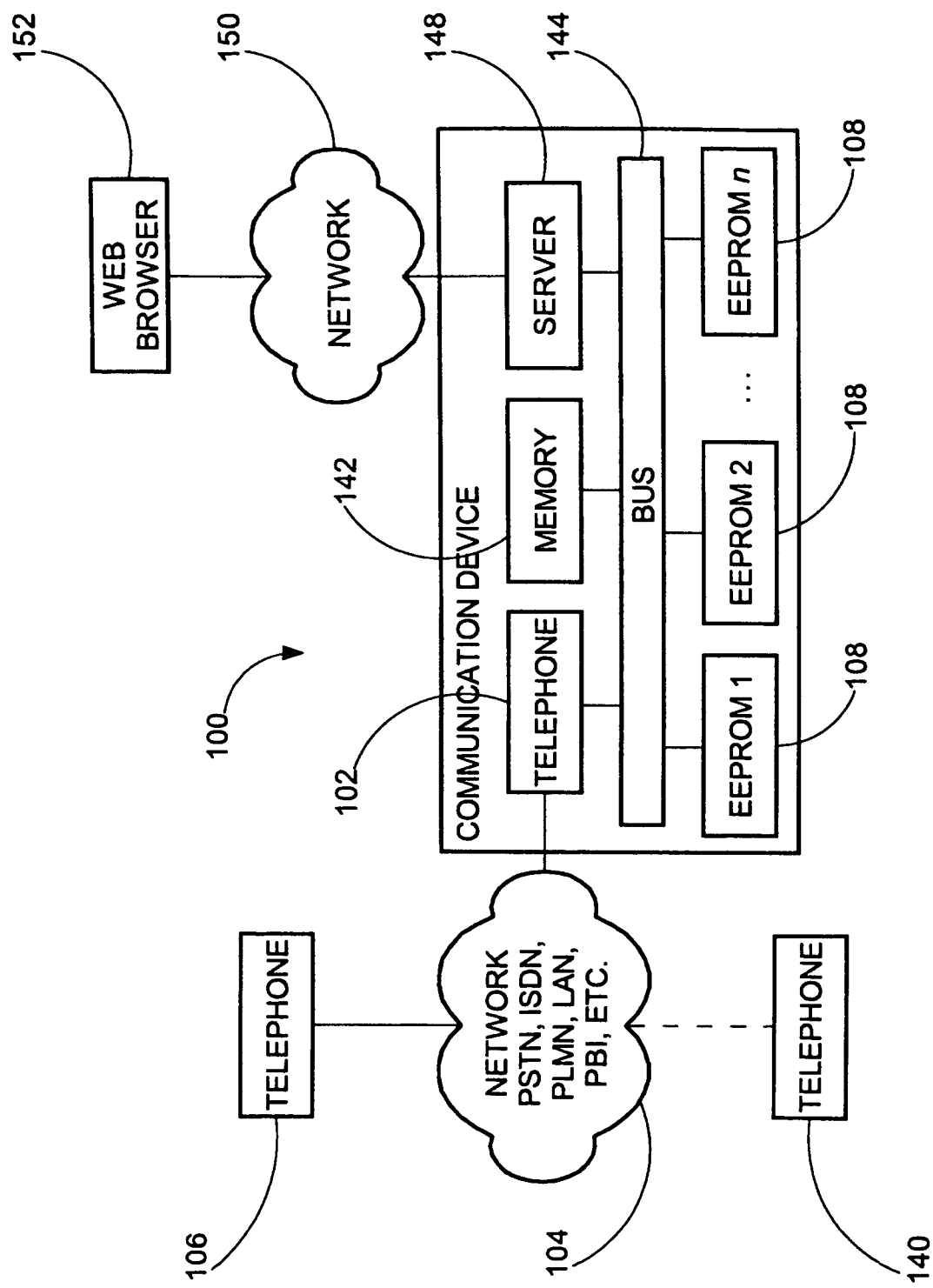
FIG. 1 is a block diagram illustrating a communication device in accordance with an exemplary embodiment of the present invention.
Figure 2:
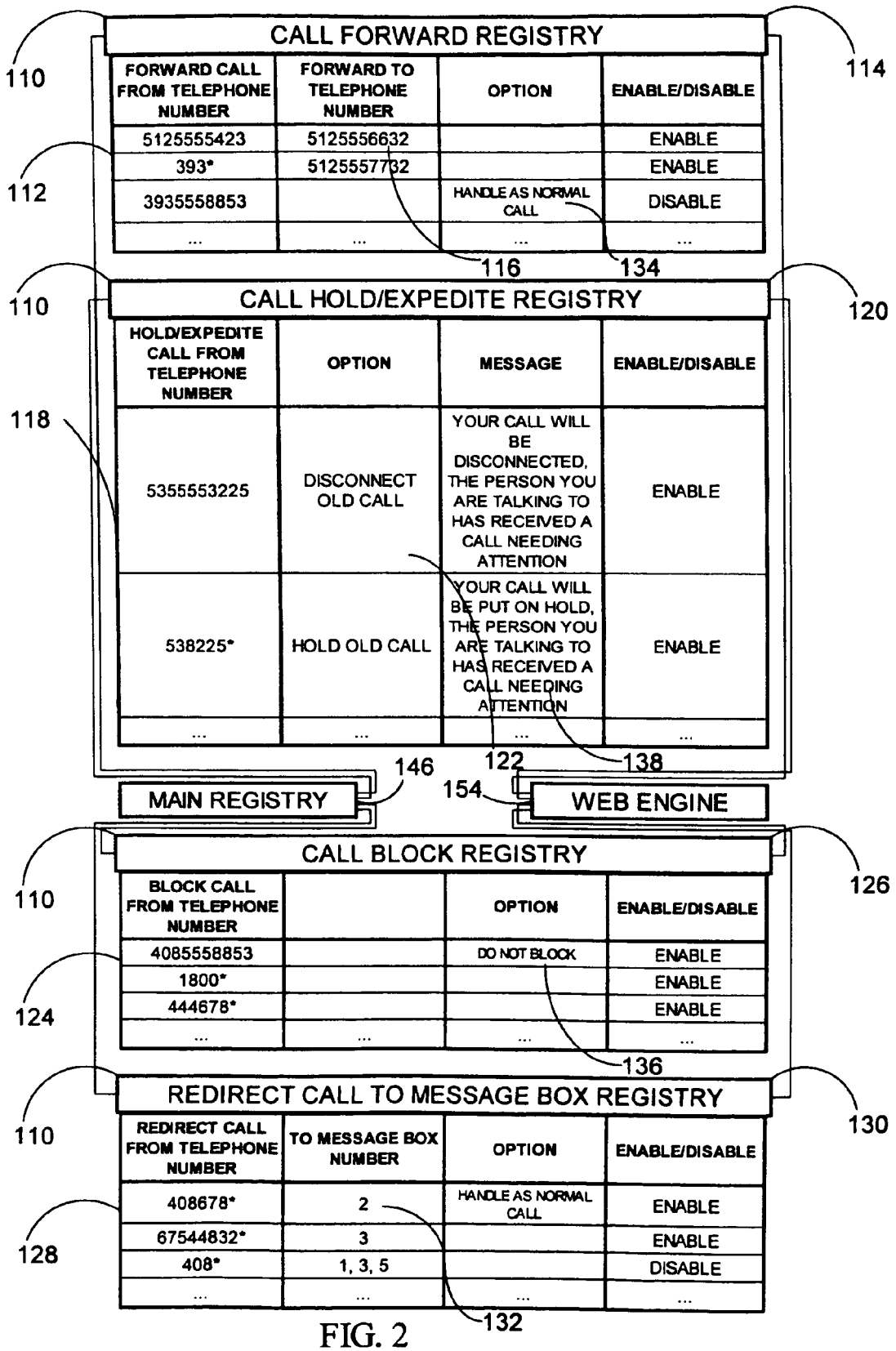
FIG. 2 is a block diagram of registries including caller identification information for use with the communication device illustrated in FIG. 1.
Figure 3:
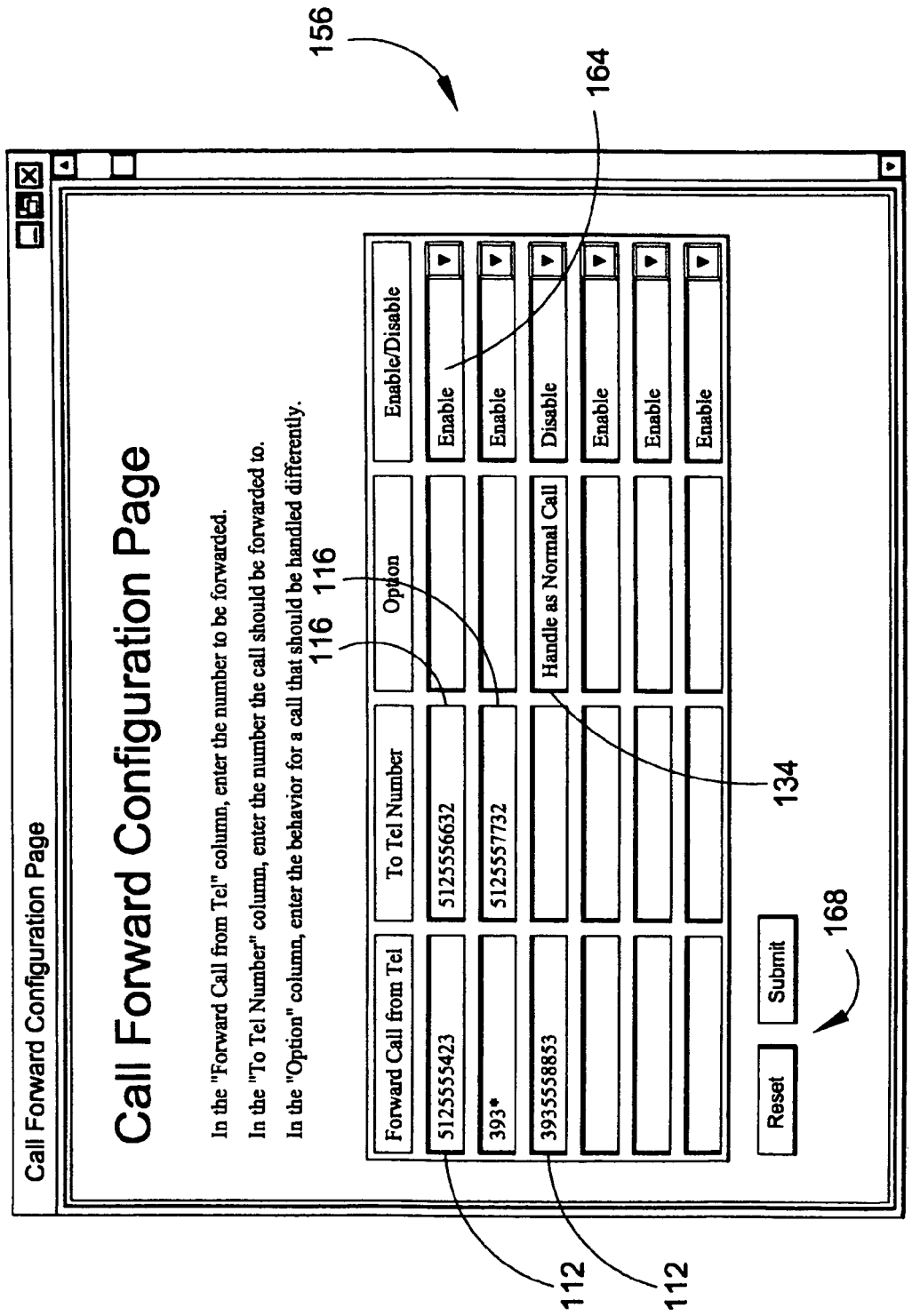
FIG. 3 is a call forward configuration screen served by a web engine included with a communication device in accordance with an exemplary embodiment of the present invention.

Reference will now be made in detail to the presently preferred embodiments of the invention, examples of which are illustrated in the accompanying drawings.

Referring generally to FIGS. 1 through 6, a communication device 100 in accordance with an exemplary embodiment of the present invention is described. The communication device 100 includes a telephone 102 for receiving a telephone call transmitted over a network 104 from a distant station, such as a telephone 106, and reproducing sounds produced at the telephone 106. Similarly, a telephone call may be transmitted from the telephone 102 to the telephone 106 via the network 104. For example, in one specific embodiment, the telephone 102 is utilized to receive a telephone call placed over the Public Switched Telephone Network (PSTN) by a user at the telephone 106. In another embodiment, the telephone 102 is a mobile telephone, such as a cellular telephone, or the like. The telephone 102 may also be utilized for receiving a printed page or an image transmitted by a facsimile (fax) machine. Further, the telephone 102 may include that portion of the communication device 100 providing conventional telephone features, such as a computer used to receive a telephone call or a fax transmitted over the Internet. In other embodiments, the telephone 102 is utilized for receiving voice and/or data transmitted over a network 104 such as an Integrated Services Digital Network (ISDN), a Public Land Mobile Network (PLMN), a Wide Area Network (WAN), and a Local Area Network (LAN). Those of ordinary skill in the art will appreciate that the network 104 is described by way of example and is not meant to limit the scope of the present invention. Thus, it should be noted that any network 104 for transmitting a telephone call including caller identification information may be utilized with the communication device 100 of the present invention.

The communication device 100 includes one or more programmable modules 108 configured for storing a registry 110 of caller identification information. The registry 110 includes caller identification information to be compared against similar information supplied with an incoming telephone call, such as caller identification information provided with a telephone call from the telephone 106. When the incoming telephone call includes matching caller identification information, the communication device 100 may perform a specific action based on instructions included with the programmable module 108, selectively handling the telephone call. For example, a telephone call including caller identification information matching a specific area code specified in the registry 110 may be blocked. In one embodiment, the programmable module 108 includes Electrically Erasable Programmable Read Only Memory (EEPROM). The EEPROM may be provided on an Integrated Circuit (IC) chip, which may be inserted into a corresponding port included with the communication device 100. Alternatively, several EEPROM chips may be included with a chip carrier/module for inserting into a corresponding port in the communication device 100. Multiple EEPROM chips may be included with the communication device 100 for providing functionality as required. When an incoming telephone call contains caller identification information matching a registry entry stored in the EEPROM, the telephone 102 is instructed to perform an action corresponding with the functionality of the registry 110.

For example, in a specific embodiment, when an incoming telephone call contains information 112 matching caller identification information stored in a call forward registry 114, the incoming telephone call is forwarded to a second telephone number 116 stored in the registry 110. In another embodiment, when an incoming telephone call contains information 118 matching caller identification information stored in a call hold/expedite registry 120, the incoming telephone call is connected in favor of another telephone call, which may be put on hold or disconnected, according to a specified option 122 stored in the registry 110. In a further embodiment, when an incoming telephone call contains information 124 matching caller identification information stored in a call block registry 126, the incoming telephone call is not connected to the telephone 102; thus, the telephone call is blocked. In a still further embodiment of the communication device 100, when an incoming telephone call contains information 128 matching caller identification information stored in a redirect call to message box registry 130, the incoming telephone call is forwarded to one or more message boxes 132 stored in the registry 110. Those of skill in the art will appreciate that any combination of these functionalities may be utilized with the communication device 100, such as utilizing the call forward registry 114 with the call hold/expedite registry 120, or the like. Further, other registries 110 may be provided without departing from the scope and intent of the present invention.

In exemplary embodiments, information included in a registry 110 of the communication device 100 may be fully or partially representative of caller identification information included with a telephone call. Preferably a wildcard character, such as an asterisk '*', a dollar sign '$', or the like may be used to identify caller identification information stored in the registry 110, which may be compared with caller identification information supplied with a telephone call, such as a telephone call placed from the telephone 106. For example, an entry in the registry 110 containing "552*", when compared with caller identification information starting with "552", may comprise a match. In this manner, a telephone call from a particular area code may be forwarded, blocked, redirected, or the like. However, it may be desirable to handle a certain telephone call having caller identification information starting with another pre-specified series of digits differently from other calls having the same pre-specified series of digits. For this reason, multiple entries having different numbers of digits before a wildcard character (or, alternatively, entries without a wildcard character) may be included in the registry 110 of the communication device 100 of the present invention. For example, in one specific embodiment, the call forward registry 114 may contain caller identification information 112 including a registry entry comprising "393*". In this instance, any telephone call including caller identification information starting with the digits "393" may be forwarded to a second telephone number 116 stored in the registry 110. However, if caller identification information 112 is included having a registry entry of "3935558853", for instance, a telephone call having caller identification information including this pre-specified sequence of digits may be handled as a normal telephone call, as specified by an option 134. Similarly, in another specific embodiment, the call block registry 126 may contain an option 134 for handling a telephone call originating from a number "4085558853" in a typical or normal manner, i.e. connecting the telephone call when it is received instead of blocking it.

Pattern matching and other suitable techniques may be used for comparing information in the registry 110 with caller identification information received with a telephone call, as contemplated by one of skill in the art. For example, in other embodiments, a wildcard character may be included before a series of digits, such as "*393", while in still further embodiments, textual characters may be used in combination with a wildcard character, such as "smit*". It will be appreciated that other combinations of numbers and textual characters may be used as well, including caller identification information comprising a telephone number, a name, a time, a date, and other information.

Other options may also be included for selectively handling incoming telephone calls without departing from the scope and spirit of the present invention. For instance, a message 138 may be included in the registry 110 for a user of a telephone 140 who may be put on hold or disconnected so that another telephone call, such as a telephone call from the telephone 106, may be connected as specified by the call hold/expedite registry 120. The message 138 may be audibly presented to the user of the telephone 140, or, alternatively, may be presented as text if the telephone 140 provides for the visual presentation of textual information, such as when the telephone 140 includes a computer, a telephone for the hearing impaired, or the like. In still further embodiments, registry entries may be provided in combination with time and date information. For instance, a user of the communication device 100 may wish to receive a telephone call including specific caller identification information during a particular time of day, while blocking the same telephone call when it is received at a different time of day.

In exemplary embodiments of the present invention, the communication device 100 includes memory 142, such as Random Access Memory (RAM), Read Only Memory (ROM), flash memory, or the like, which may be connected to the telephone 102 and the programmable module 108 via bus architecture 144. The memory 142 includes a main registry 146, for storing caller identification information stored in the programmable module 108. For example, when caller identification information including "393*" is stored in the call forward registry 114 of the programmable module 108, "393*" is also stored in the main registry 146. Then, when a telephone call including such caller identification information is received, the main registry instructs the communication device 100 to examine the contents of the call forward registry 114 for handling the telephone call. Those of skill in the art will appreciate that the main registry 146 may include a single entry for similar entries included in one or more programmable modules 108, along with a list of programmable modules 108 in which a specified entry may be located. However, it is contemplated that the main registry 146 may also include duplicate entries and truncated caller identification information, utilize hashing, and employ other techniques for directing the communication device 100 to examine the contents of one or more programmable modules 108.

Moreover, the communication device 100 may omit the main registry 146, instead checking each programmable module 108 in sequence. It is further contemplated that when conflicting information is found in two programmable modules 108, the communication device 100 may be equipped with instructions for resolving conflicts. For example, the call block registry 126 may include an area code to be blocked, such as "393*", while the call forward registry may include the identical area code to be forwarded. In such an instance, the communication device may handle telephone calls from the pre-specified area code "393" according to logic for resolving the conflict, such as handling a telephone call from area code "393" in a manner prescribed by the first programmable module 108 examined by the communication device I 00 in sequence. Alternatively, the user of the communication device 100 may be presented with a list of options for resolving such conflicts. The communication device 100 may then prompt the user for information to resolve a future conflict, such as presenting a dialogue containing the question "always handle a call from area code '393' in the specified manner?" or the like.

The communication device 100 includes a server 148 for serving up a web page for configuring the programmable module 108. In exemplary embodiments, the server 148 may be connected via a network 150 to a web browser 152. The network 150 may include the same network 104 connecting the telephone 102 to the telephones 106 and 140, or, alternatively, may include a separate network. Additionally, the web browser 152 may be included as an integral part of the communication device 100, such as if the communication device includes a display screen for presenting graphical or textual information to the user. The web browser 152 is served a web based configuration tool, such as a Hypertext Markup Language (HTML) web page or the like, via a web engine 154 included with the server 148. The web engine 154 may be provided as software, hardware, firmware, or the like for interfacing with the web browser 152. The server 148 is connected to the telephone 102 and the programmable module 108 via bus architecture 144 for configuring the programmable module. In embodiments, the user communicates with the server for configuring the programmable module 108.

Figure 4:
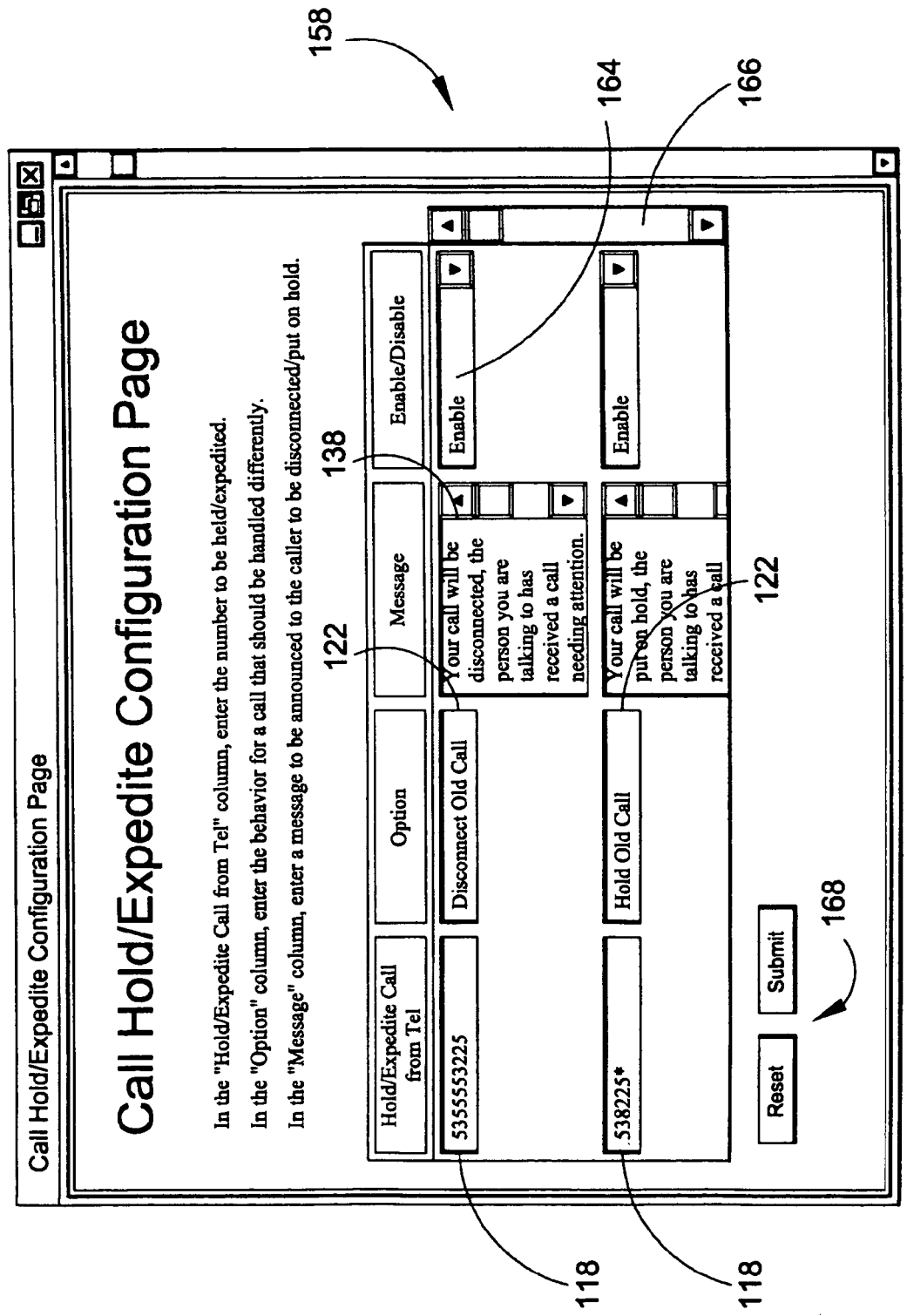
FIG. 4 is a call hold/expedite configuration screen served by a web engine included with the communication device in accordance with an exemplary embodiment of the present invention.
Figure 5:
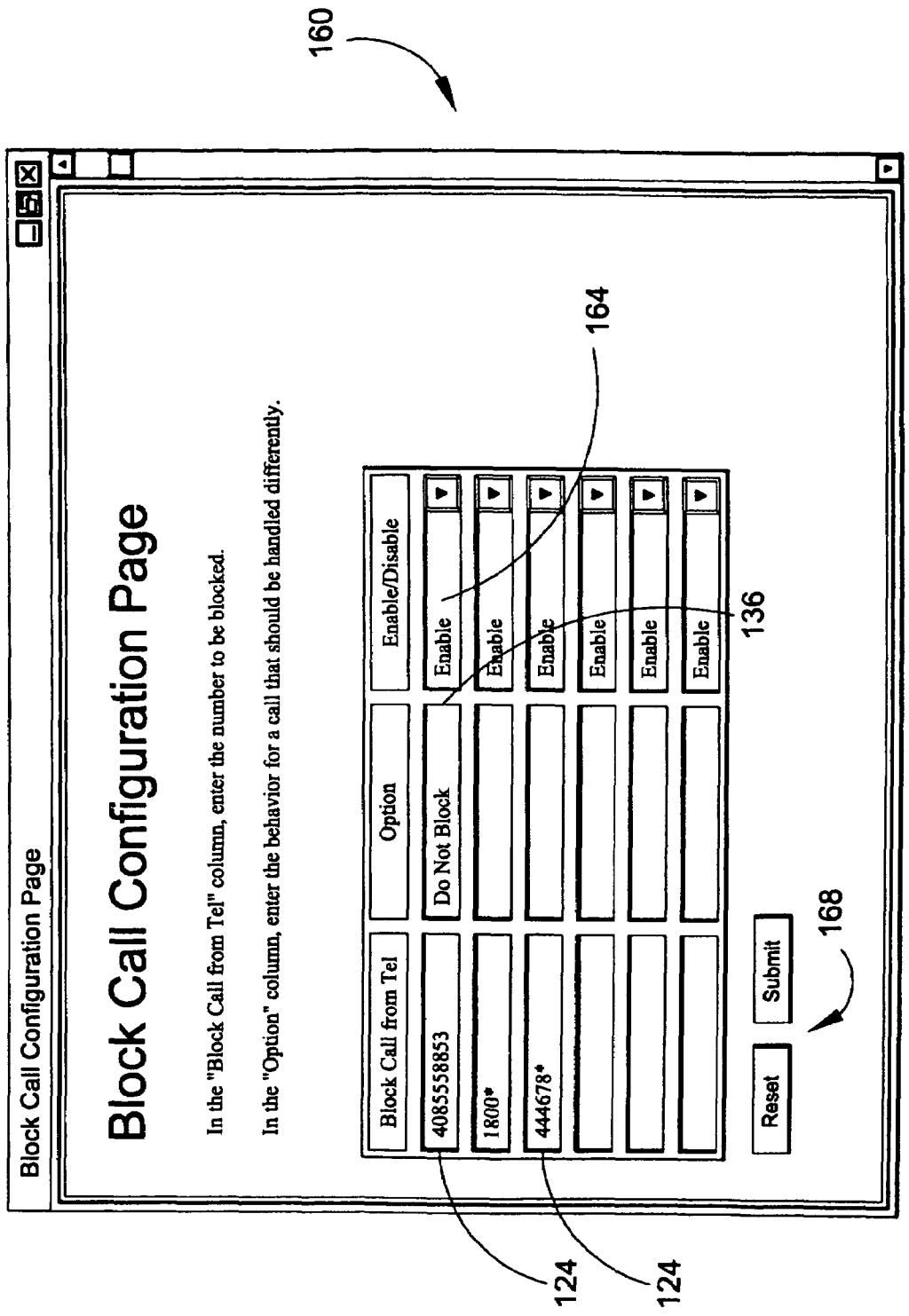
FIG. 5 is a block call configuration screen served by a web engine included with the communication device in accordance with an exemplary embodiment of the present invention.
Figure 6:
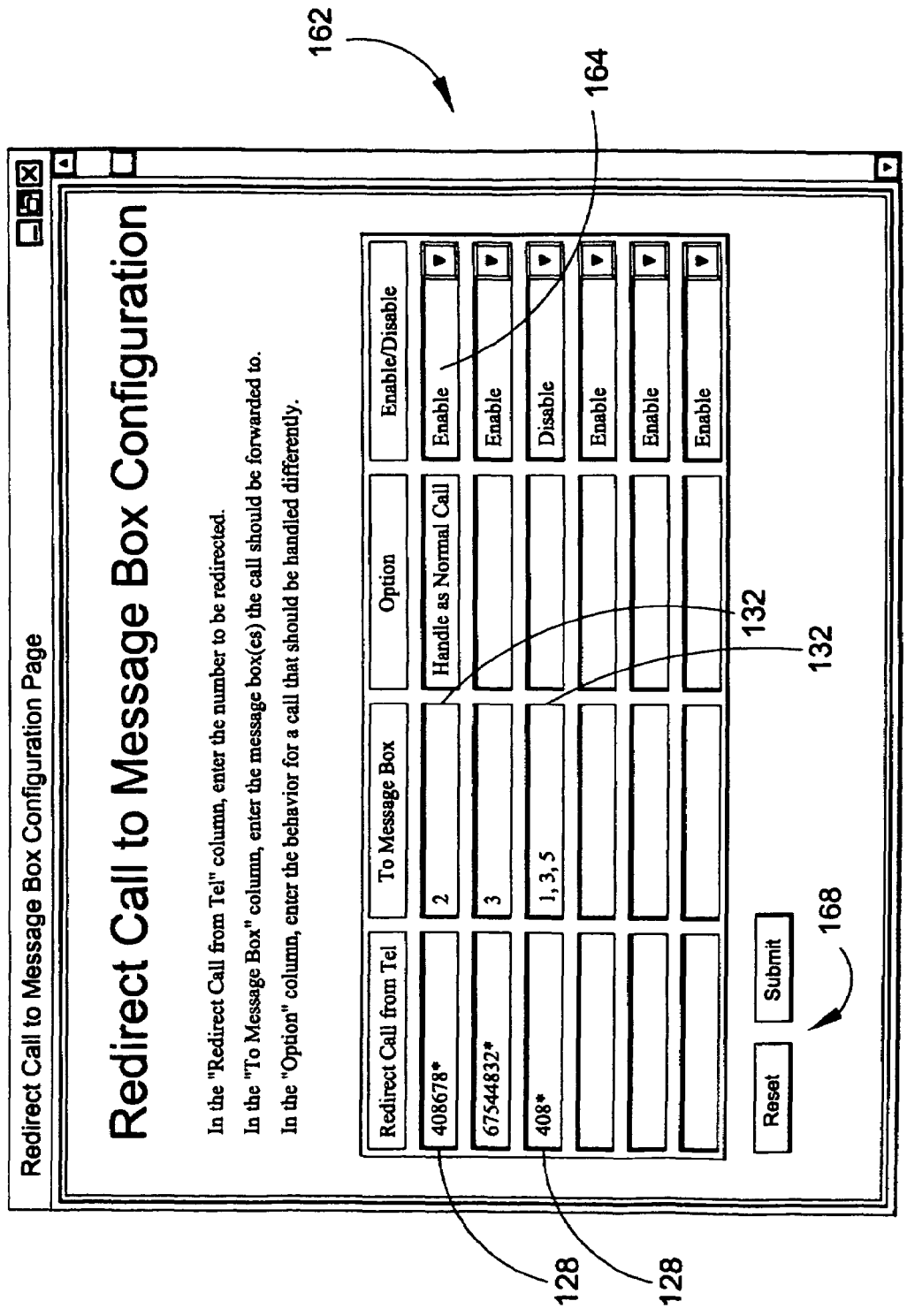
FIG. 6 is a redirect call to message box configuration screen served by a web engine included with the communication device in accordance with an exemplary embodiment of the present invention.

As seen in FIGS. 3 through 6, programmable modules 108 are configured via web pages served to the web browser 152 by the web engine 154. For example, in the specific embodiment seen in FIG. 3, a call forward configuration page 156 may be utilized for configuring a programmable module 108 including the call forward registry 114. Text and dialogue boxes may be provided for allowing a user of the communication device 100 to specify caller identification information, options, messages, and the like. Further, pull down boxes 164 or the like may be provided for allowing a user to enable or disable certain functionality without deleting entries from the registry 110. Similarly, as illustrated in FIG. 4, a call hold/expedite configuration page 158 may be utilized for configuring a programmable module 108 including the call hold/expedite registry 120. The call hold/expedite configuration page 158 may include a scroll bar 166 or the like for allowing a user to scroll through text entry fields that may not be displayable in a pre-specified area on the page. As illustrated in FIG. 5, a block call configuration page 160 is utilized for configuring a programmable module 108 including the call block registry 126. Reset and submit buttons 168 or the like may be provided for allowing a user to erase information on a page, instruct the communication device 100 to update information stored in the registry 110, and perform other functions as needed. Finally, as seen in FIG. 6, in a further embodiment, a redirect call to message box configuration page 162 may be utilized for configuring a programmable module 108 including the redirect call to message box registry 130. Those of skill in the art will appreciate that various text entry and dialog boxes may be provided with the web pages illustrated in FIGS. 3 through 6 without departing from the scope and intent of the present invention.

In exemplary embodiments of the present invention, the communication device 100 provides functionality for announcing caller identification information received with a telephone call to a user of the device. For instance, in one embodiment, the communication device 100 includes an external speaker and the ability to announce a name and telephone number associated with a particular telephone call. In another embodiment, the programmable module 108 includes a registry 110 having pre-specified data to announce upon receipt of a telephone call including caller identification information stored in the registry 110. For example, a telephone call from a specific area code may be announced with the area code. Further, a telephone call from a specific individual, identified via caller identification information received with the telephone call, may be announced using the caller identification information, or, alternatively, using pre-specified information stored in the programmable module 108, such as a first name, a nickname, or the like. Those of skill in the art will appreciate that appropriate hardware, software, and/or firmware may be provided for supplying the functionality to audibly reproduce caller identification information, such as a text to speech converter or the like.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A communication device for receiving a telephone call including caller identification information, comprising:
   a programmable module configured for storing a first registry of caller identification information, the programmable module specifying behavior for selectively handling the telephone call, the specified behavior being associated with an entry in the first registry and including at least one of:
   forwarding the telephone call;
   blocking the telephone call;
   directing the telephone call to a message box;
   placing a second telephone call on hold and connecting the telephone call; and
   disconnecting the second telephone call and connecting the telephone call;
   a port for receiving the programmable module;
   a second programmable module configured for storing a second registry of caller identification information;
   a second port for receiving the second programmable module; and
   a main registry of caller identification information, wherein the main registry includes caller identification information and wildcard identification information included in each of the first and second registries, and the main registry is for selectively comparing a received caller identification information with the first and second registries of the caller identification information and wildcard identification information, wherein the communication device is configured to compare the received caller identification information with the first registry of caller identification information and wildcard identification information for selectively handling the telephone call, compare the received caller identification information with the second registry of the caller identification information and wildcard identification information for selectively handling the telephone call, and includes a web engine for serving up a web page providing an interface for configuring the programmable module and a telephone, the registry entry comprises a telephone number, and the received caller identification information is utilized for making an audible announcement describing the telephone call.

\* \* \* \* \*